US009059785B2

(12) United States Patent
Fertonani et al.

(10) Patent No.: US 9,059,785 B2
(45) Date of Patent: Jun. 16, 2015

(54) FAST TIMING ACQUISITION IN CELL SEARCH

(75) Inventors: Dario Fertonani, La Jolla, CA (US); Aamod Dinkar Khandekar, San Diego, CA (US); Srikanth Gummadi, Secunderabad (IN); Peter John Black, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 13/178,374

(22) Filed: Jul. 7, 2011

(65) Prior Publication Data

US 2013/0010780 A1    Jan. 10, 2013

(51) Int. Cl.
*H04B 1/16*    (2006.01)
*H04B 1/7073*    (2011.01)

(52) U.S. Cl.
CPC .......... *H04B 1/7073* (2013.01); *H04B 1/70735* (2013.01); *H04B 2201/70718* (2013.01)

(58) Field of Classification Search
CPC ..... H04L 5/001; H04L 5/0035; H04L 5/0048; H04L 5/0053; H04L 5/0051; H04L 5/0073; H04L 5/005; H04W 24/02; H04W 24/10; H04W 24/08; H04W 72/042; H04W 56/00; H04B 1/7073; H04B 1/70735; H04B 2201/70718
USPC ................................. 370/252, 342–345, 456
See application file for complete search history.

(56) References Cited

U.S. PATENT DOCUMENTS 7,697,486 B2 *   4/2010  Lee et al. ...................... 370/335
8,447,601 B2 *   5/2013  Wang ............................ 704/233
2006/0227855 A1 *  10/2006  Xu et al. ........................ 375/149
2007/0076644 A1 *   4/2007  Bachl et al. ................... 370/313
2007/0081489 A1 *   4/2007  Anderson et al. ............. 370/329
2007/0189229 A1 *   8/2007  Li et al. ......................... 370/335
2009/0040998 A1 *   2/2009  Park .............................. 370/345
2009/0040999 A1 *   2/2009  Yuk ............................... 370/345
2011/0122823 A1 *   5/2011  Chen ............................. 370/328
2011/0243271 A1 *  10/2011  Takahashi et al. ............ 375/295
2011/0263265 A1 *  10/2011  Caretti et al. ................. 455/450
2012/0140673 A1 *   6/2012  Tateno ........................... 370/253
2013/0017828 A1 *   1/2013  Weng et al. ................... 455/434
2014/0254580 A1 *   9/2014  Shim et al. .................... 370/342
2014/0269597 A1 *   9/2014  Park et al. ..................... 370/329
2014/0286283 A1 *   9/2014  Kim et al. ..................... 370/329

FOREIGN PATENT DOCUMENTS

CN     1581999 A       2/2005
CN     101090557 A    12/2007
CN     101212246 A     7/2008
EP     1653751 A1      5/2006

OTHER PUBLICATIONS

International Search Report and Written Opinion—PCT/US2012/045837—ISA/EPO—Sep. 21, 2012.

\* cited by examiner

*Primary Examiner* — Thai Hoang

(74) *Attorney, Agent, or Firm* — Kristine U. Ekwueme

(57) ABSTRACT

Timing acquisition may be performed without typical correlation computations by determining a power of a received signal at certain points in time and using the determined power to identify gaps in the received signal. By determining gaps in the received signal, frame timing may be estimated, particularly in time-division networks where the location of guard periods within a frame is known. Gap detection may thus be used for timing acquisition.

17 Claims, 5 Drawing Sheets

FAST TIMING ACQUISITION IN CELL SEARCH

BACKGROUND

1. Field

Aspects of the present disclosure relate, in general, to wireless communication systems, and more particularly, to timing acquisition in a wireless network, particularly in a Time Division—Synchronous Code Division Multiple Access (TD-SCDMA) network cell search.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division—Code Division Multiple Access (TD-CDMA), and Time Division—Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

A method of detection frame timing in a wireless communication network is offered. The method includes determining a set of received powers spanning different portions of a frame. The method also includes detecting a gap in transmission from the determined set of received powers.

An apparatus for detecting frame timing in a wireless communication network is offered. The apparatus includes means for determining a set of received powers spanning different portions of a frame. The apparatus also includes means for detecting a gap in transmission from the determined set of received powers.

A computer program product for detecting frame timing in a wireless communication network is offered. The computer program product includes a non-transitory computer-readable medium having non-transitory program code recorded thereon. The program code includes program code to determine a set of received powers spanning different portions of a frame. The program code also includes program code to detect a gap in transmission from the determined set of received powers.

An apparatus for detecting frame timing in a wireless communication network is offered. The apparatus includes a memory and a processor(s) coupled to the memory. The processor(s) is configured to determine a set of received powers spanning different portions of a frame. The processor(s) is also configured to detect a gap in transmission from the determined set of received powers.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
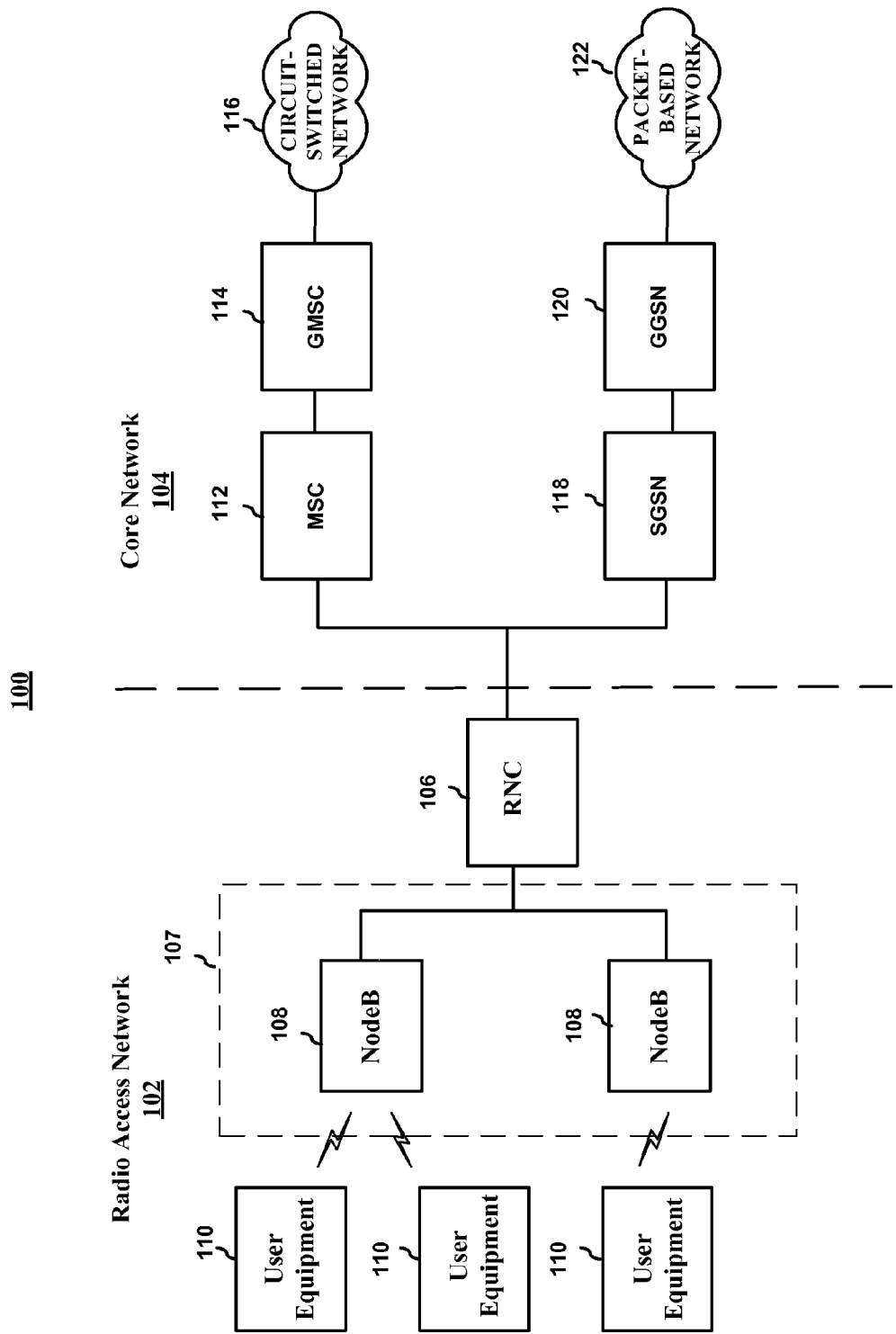
FIG. 1 is a block diagram illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (Radio Access Network) RAN 102 (e.g., UTRAN) that provides various wireless services including telephony, video, data, messaging, broadcasts, and/or other services. The RAN 102 may be divided into a number of Radio Network Subsystems (RNSs), such as an RNS 107, each controlled by a Radio Network Controller (RNC), such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces, such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a Base Station (BS), a Base Transceiver Station (BTS), a radio base station, a radio transceiver, a transceiver function, a Basic Service Set (BSS), an Extended Service Set (ESS), an Access Point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a Session Initiation Protocol (SIP) phone, a laptop, a notebook, a netbook, a smartbook, a Personal Digital Assistant (PDA), a satellite radio, a Global Positioning System (GPS) device, a multimedia device, a video device, a digital audio player (e.g., MP3 player), a camera, a game console, or any other similar functioning device. The mobile apparatus is commonly referred to as User Equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an Access Terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The Downlink (DL), also called the forward link, refers to the communication link from a Node B to a UE, and the Uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a Visitor Location Register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a Home Location Register (HLR) (not shown) containing subscriber data, such as the data reflecting the details of the services to which a particular user has subscribed. The HLR is also associated with an Authentication Center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a Serving GPRS Support Node (SGSN) 118 and a Gateway GPRS Support Node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a Time Division Duplexing (TDD), rather than a Frequency Division Duplexing (FDD) as used in many FDD mode UMTS/W-CDMA systems. TDD uses the same carrier frequency for both the Uplink (UL) and Downlink (DL) between a Node B 108 and a UE 110, but divides uplink and downlink transmissions into different time slots in the carrier.

Figure 2:
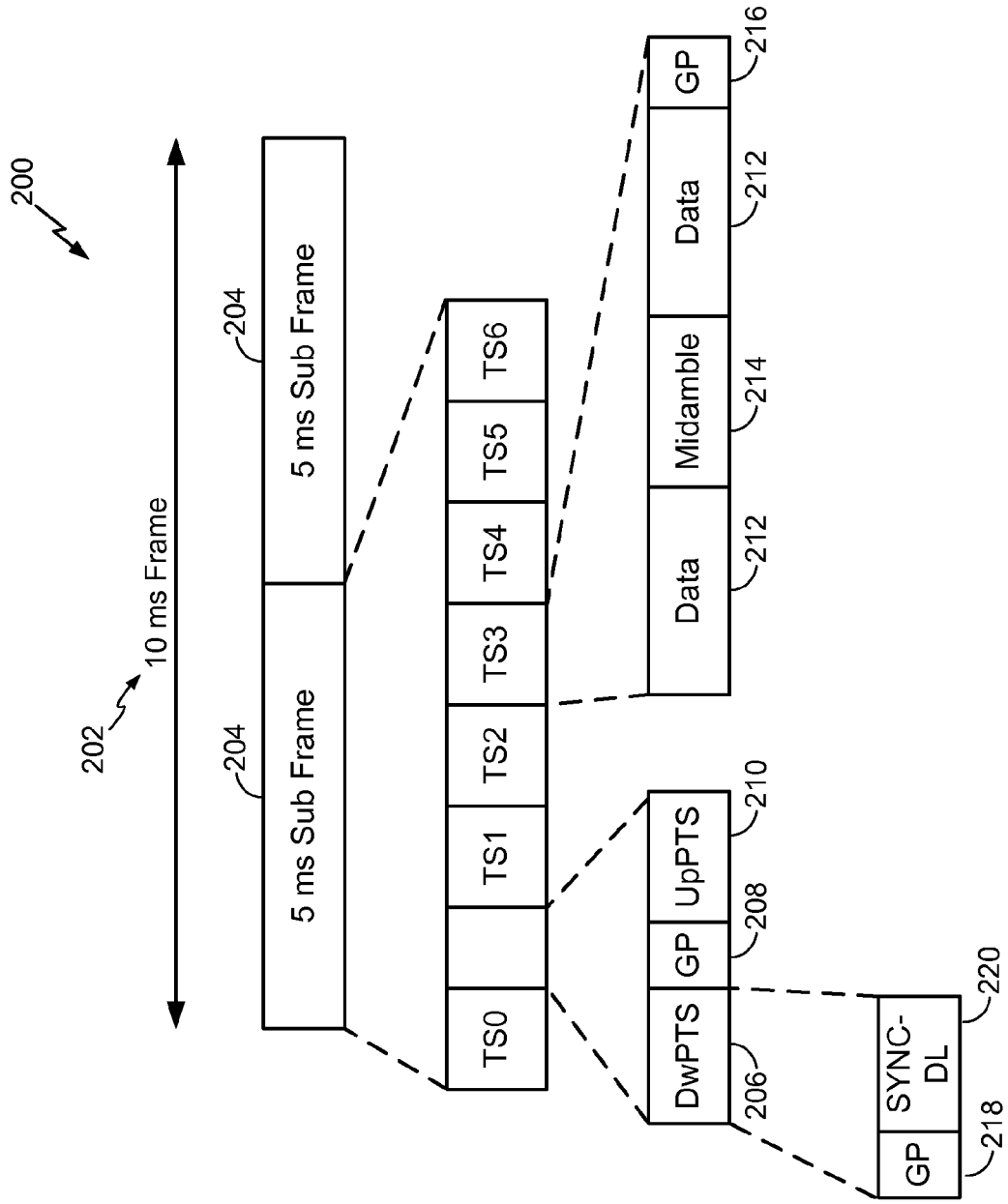
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A Downlink Pilot Time Slot (DwPTS) 206 (also known as the Downlink Pilot Channel (DwPCH)), a guard period (GP) 208, and an Uplink Pilot Time Slot (UpPTS) 210 (also known as the uplink pilot channel (UpPCH)) are located between TS0 and TS1. The Downlink Pilot Time Slot 206 is 96 chips (75 μs) in length. The guard period 208 is 96 chips (75 μs) in length. The Uplink Pilot Time Slot 210 is 160 chips (125 μs) in length. The Downlink Pilot Time Slot 206 includes a guard period 218 and a synchronization downlink (SYNC-DL) sequence 220. The guard period 218 is 32 chips (25 μs) in length. The SYNC-DL sequence 220 is 64 chips (50 μs) in length. Each time slot, TS0-TS6, may allow data transmission multiplexed on a maximum of 16 code channels. Each time slot TS0-TS6 is 675 μs in length. Data transmission on a code channel includes two data portions 212 separated by a midamble 214 and followed by a Guard Period (GP) 216. The midamble 214 may be used for features, such as channel estimation, while the GP 216 may be used to avoid inter-burst interference.

Figure 3:
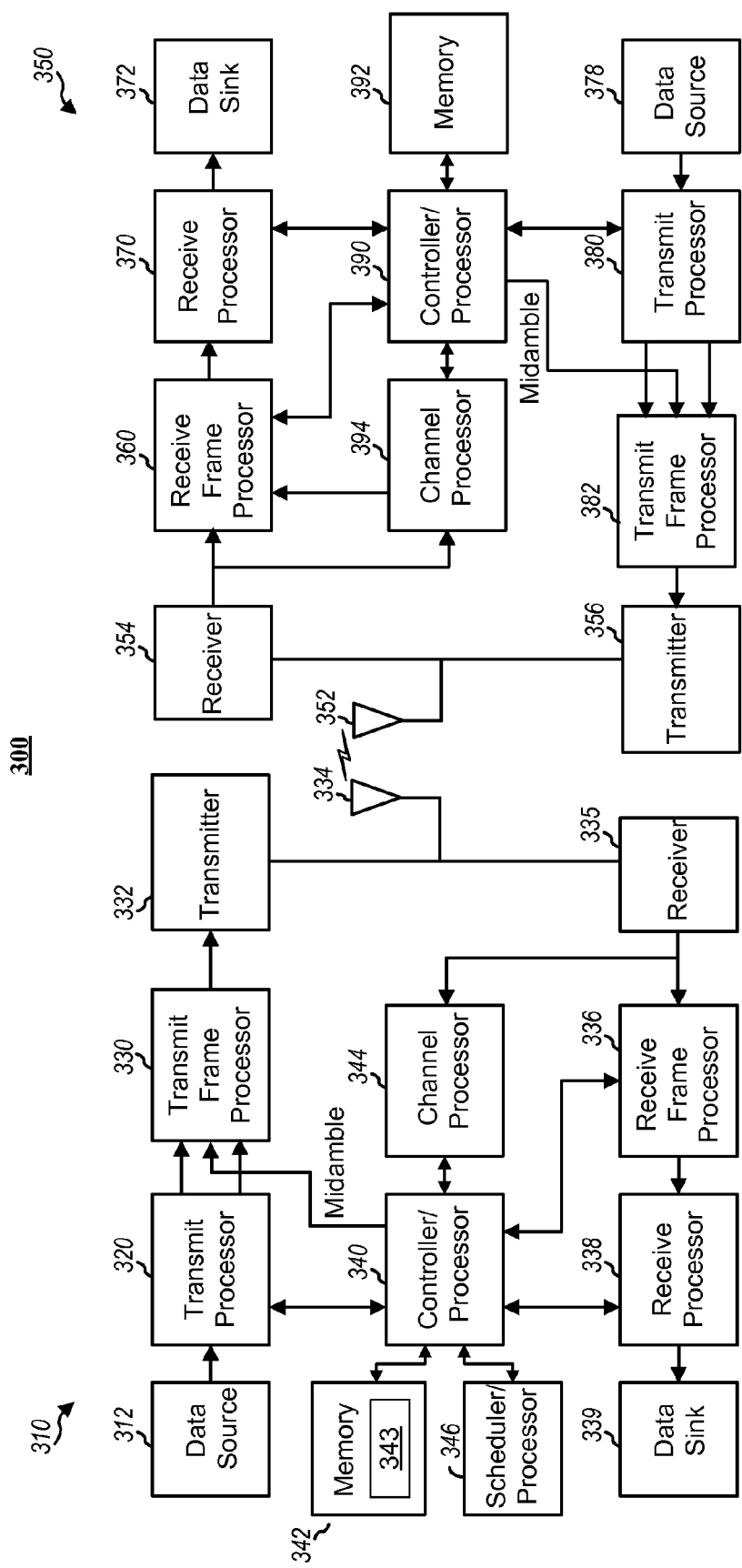
FIG. 3 is a block diagram of a Node B in communication with a user equipment in a radio access network.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide Cyclic Redundancy Check (CRC) codes for error detection, coding and interleaving to facilitate Forward Error Correction (FEC), mapping to signal constellations based on various modulation schemes (e.g., Binary Phase-Shift Keying (BPSK), Quadrature Phase-Shift Keying (QPSK), M-Phase-Shift Keying (M-PSK), M-Quadrature Amplitude Modulation (M-QAM), and the like), spreading with Orthogonal Variable Spreading Factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an Acknowledgement (ACK) and/or Negative Acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard, pointing device, track wheel, and the like). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the smart antennas 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor 340, respectively. If some of the frames were unsuccessfully decoded by the receive processor 338, the controller/processor 340 may also use an Acknowledgement (ACK) and/or Negative Acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. For example, the memory 342 of the Node B 310 includes a handover module 343, which, when executed by the controller/processor 340, the handover module 343 configures the Node B to perform handover procedures from the aspect of scheduling and transmission of system messages to the UE 350 for implementing a handover from a source cell to a target cell. A scheduler/processor 346 at the Node B 310 may be used to allocate resources to the UEs and schedule downlink and/or uplink transmissions for the UEs not only for handovers, but for regular communications as well.

There are a number of situations when a user equipment may attempt to acquire a signal, including during power-on, wake up, etc. When a user equipment attempts to locate a signal in a TD-SCDMA network on a certain frequency band, the user equipment does not know whether any cell is actually transmitting on that band, nor any timing associated with such transmissions. In TD-SCDMA, to help during this acquisition stage, each base station transmits the same pilot signal at every subframe (i.e., every 6400 chips=5 milliseconds (ms)). Different base stations may use different pilot signals in the downlink pilot time slot. Each pilot signal identifies the base station from which it was sent. These signals are known as synchronization downlink (SYNC-DL) sequences. There are 32 different SYNC-DL sequences, each is 64-chips (50 microseconds (μs)) long.

Typically, correlation-based algorithms are used in the acquisition stage. Such correlation-based algorithms involve computing a correlation between each SYNC-DL sequence possibly transmitted, and each 64-chip window of received samples possibly aligned to the SYNC-DL sequence. Because no timing reference is yet available at this stage, all 64-chip windows in an interval of 5 ms (i.e., the repetition period for the pilot signal) are equally likely. Each subframe 204, as shown in FIG. 2, is 6,400 chips in length. This results in the testing of 6,400 potential windows (5 ms*1.28 Mcps) if the target granularity for timing acquisition is one chip, or 12,800 windows (5 ms*2.56 Mcps) if the target granularity is half a chip. The evaluation of so many correlations results in a significant expenditure of time and power consumption and may bottleneck the processing during the acquisition stage.

In one aspect of the present disclosure, a method is proposed which allows a rough timing acquisition without the typical correlation computations. The proposed method may reduce the SYNC-DL acquisition time by a factor on the order of 100.

As part of TD-SCDMA communications, a first time slot in a subframe, called time slot zero (TS0), and the SYNC-DL field are transmitted with similar power and are separated by a silent guard period of 48 chips, 16 chips at the end of TS0 and 32 chips as part of a guard period 218 at the beginning of the Downlink Pilot Time Slot 206. The SYNC-DL field and the following time slot, time slot one (TS1) are also separated by a guard period. This sequence of TS0, guard, SYNC-DL field, guard, makes up a power pattern characterized by high-low-high-low (HLHL). The first low zone has a duration of 48 chips and the second high zone has a duration of 64 chips. This particular HLHL power pattern is unique in the TD-SCDMA subframe. Because TD-SCDMA communications are synchronous, the pattern is preserved even in the presence of interfering cells. The particular HLHL pattern may be specifically targeted as described below to improve timing acquisition.

A power profile $Q_k$ is defined at chip index k. The power profile $Q_k$ is the received power accumulated over a certain number (A) of consecutive chips starting from chip index k accumulated over all receive antennas. $Q_k$ may be calculated as:

$$Q_k = \sum_a \sum_{n=0}^{A-1} |y_{a,n+k}|^2$$

where, in the received sample $y_{a,n+k}$, a is the antenna index and n+k is the sample index. Alternatively, other reasonable definitions of power profile may be used. The parameter A sets the duration of the moving-average window used to define the power profile $Q_k$. The more chips used to accumulate received power (i.e., the larger the value of A), the better the noise-power averaging capability, which helps detection of the target HLHL power pattern. However, the larger A is, the more there will be smoothing of the useful signal power pattern, which will make power pattern detection more difficult. Given the value of the length of the time slots and guard periods, setting A=24 chips is recommended in one aspect of the present disclosure, though different values for A may be chosen.

A gap detection metric $M_k$ at chip index k is set as:

$$M_k = \frac{\min\{Q_{k-D_0}, Q_{k+D_1}\}}{\max\{Q_k, Q_{k+D_2}\}}$$

Figure 4:
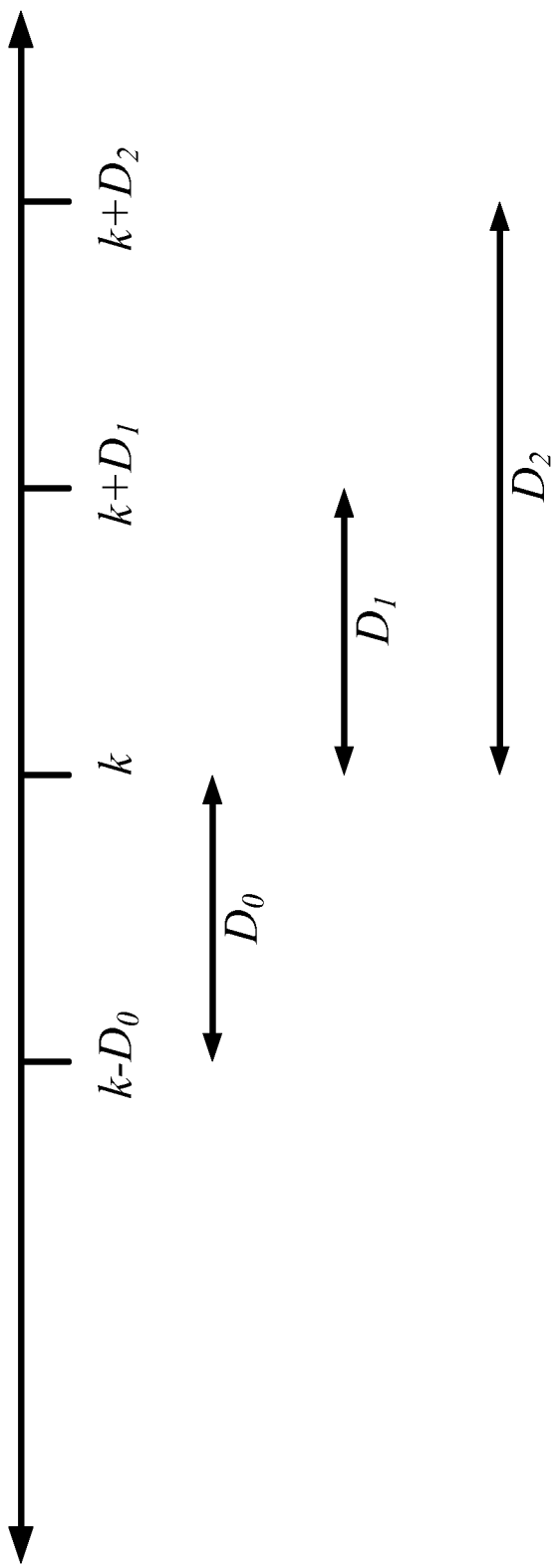
FIG. 4 is a diagram illustrating signal sample times according to one aspect of the present disclosure.

As shown in FIG. 4, $D_0$, $D_1$, and $D_2$ are integers indicating chip distances from chip index k. $D_2$ is greater than $D_1$. $M_k$ will be a ratio with the numerator being the smaller of the power detected either at time (k−$D_0$) or at time (k+$D_1$), and the denominator of $M_k$ will be the larger of the power detected either at time k or at time (k+$D_2$).

The higher the metric $M_k$, the more likely there will be an HLHL pattern at positions (k−$D_0$), k, (k+$D_1$), (k+$D_2$) as shown in FIG. 4. By choosing values of $D_0$, $D_1$, and $D_2$, $M_k$ may be used to measure the likelihood of having the sample with index k fall within the silent guard period between TS0 and SYNC-DL, namely the first L zone in the HLHL power pattern. Given the value of the length of the time slots and guard periods, values of $D_0$=56, $D_1$=56, and $D_2$=112 are recommended according to one aspect of the present disclosure, though different values may be chosen.

Using these recommended values, if k is in the gap period between TS0 and DwPTS 206 then $D_2$ (i.e., k+112) will be in the gap period 208 following DwPTS 206. In that case, both $Q_k$ and $Q_{k+D_2}$ will be low and the denominator of $M_k$ will be low, thereby making the value of $M_k$ high. With the recommended values of $D_0$, $D_1$, and $D_2$, both $Q_k$ and $Q_{k+D_2}$ will be low in likely only two situations, the first is the desired case where k is in the gap period between TS0 and DwPTS 206, the other is where k lies in the middle of an unused slot. To isolate the desired case, the recommended values of $D_0$ and $D_1$ are used to set the numerator for $M_k$.

The numerator of $M_k$ is the smaller of the power detected either at time (k−$D_0$) or at time (k+$D_1$), meaning the numerator is high only when the power detected at both those times is high. When $D_0$=56 and $D_1$=56, times (k−$D_0$) and (k+$D_1$) are 112 chips apart, the numerator of $M_k$ will only be high in two situations, the first is the desired case where k is in the gap period between TS0 and DwPTS 206, the other is where k lies in the middle of a long slot that is transmitted. By structuring the numerator and denominator of $M_k$ as illustrated above, only the desired case where k is in the gap period between TS0 and DwPTS 206 results in a high value of $M_k$.

An estimate of the gap position may be obtained by finding an index k that maximizes $M_k$. An estimate of the position of the target gap may be expressed as:

$$\hat{k}_{GAP} = \arg\max_{k \in [0:S:6399]} M_k$$

where S is a positive integer parameter. The estimate of the gap position is obtained by finding the index that achieves the highest value of $M_k$, evaluating one gap detection metric every S. S=8 is recommended in one aspect of the present disclosure. Larger values may cause performance degradation in the presence of large channel delay spreads (above 20 chips) while smaller values may provide no noticeable performance improvement. Values other than S=8 are also considered to be within the scope of the present disclosure, however.

Gap detection may be declared successful if the most desirable metric $M_k$ is above a certain threshold $Th_{GAP}$. In other words, gap detection is successful if $M_k > Th_{GAP}$. The value of $Th_{GAP}$ regulates the tradeoff between misses and false alarms. A recommended value is 2.5 (i.e., 4 dB), although other values are also contemplated. If the most desirable metric $M_k$ is not greater than the threshold, then gap detection failure may be declared.

If gap detection is successful, timing synchronization may be achieved with an uncertainty roughly equal to the silence gap duration (nominally 48 chips). Thus, the window size to test correlations against the SYNC-DL sequences is reduced to 48 chips from the benchmark value of 6,400. Even adding a margin to the nominal gap duration of 48 chips, the reduction of the search time is reduced by a factor on the order of 100.

The teachings above are illustrated for gap patterns found in TD-SCDMA communications, however the different equations and variables, such as the metric $M_k$, the power profile $Q_k$, the number of power profiles, the spacing between the power profiles, etc. may be configured to determine different power/gap pattern including those in networks other than TD-SCDMA. For example, while the above describes seeking to identify a HLHL (high-low-high-low) power pattern, the above techniques may be used to identify a HHLL power pattern, a HHL power pattern, etc.

Figure 5:
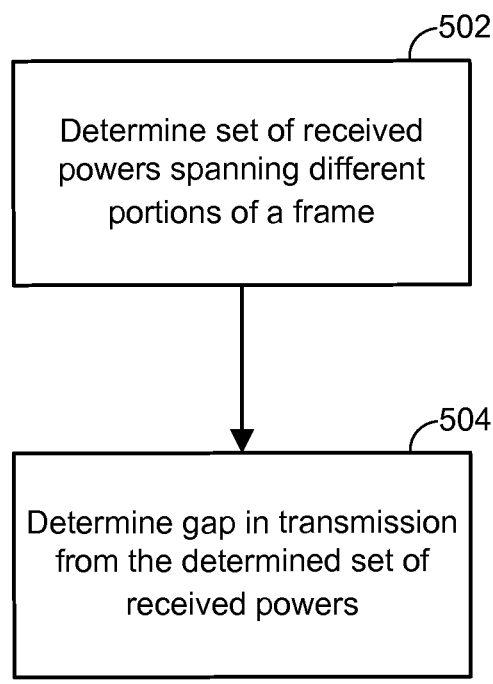
FIG. 5 is a functional block diagram illustrating example blocks executed to implement one aspect of the present disclosure.

FIG. 5 is a functional block diagram illustrating example blocks executed to implement one aspect of the present disclosure. In block 502, a set of received powers spanning different portions of a frame are determined. In block 504, a gap in transmission from the determined set of received powers is detected.

In one configuration, the apparatus, for example the UE 350, for wireless communication includes means for determining a set of received powers spanning different portions of a frame and means for detecting a gap in transmission from the determined set of received powers. In one aspect, the aforementioned means may be the antenna 352, receiver 354, receive frame processor 360, receive processor 370, and/or controller/processor 390 configured to perform the functions recited by the aforementioned means. In another aspect, the aforementioned means may be a module or any apparatus configured to perform the functions recited by the aforementioned means.

Several aspects of a telecommunications system has been presented with reference to TD-SCDMA systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, Digital Signal Processor (DSP), a Field-Programmable Gate Array (FPGA), a Programmable Logic Device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., Compact Disc (CD), Digital Versatile Disc (DVD)), a smart card, a flash memory device (e.g., card, stick, key drive), Random Access Memory (RAM), Read Only Memory (ROM), Programmable ROM (PROM), Erasable PROM (EPROM), Electrically Erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of detecting frame timing in a wireless communication network, the method comprising:
   determining a set of received powers at different sequential portions of a frame; and
   detecting a gap in transmission based on a ratio of a minimum received power of a first and third of the sequential portions relative to a maximum received power of a second and fourth of the sequential portions, the first sequential portion, second sequential portion, third sequential portion, and fourth sequential portion being sequential in time.

2. The method of claim 1 in which the wireless communication network comprises a Time Division-Synchronous Code Division Multiple Access network.

3. The method of claim 2 in which the gap in transmission comprises a gap between a first time slot of a subframe and a synchronization downlink (SYNC-DL) field of a downlink pilot time slot in the subframe.

4. The method of claim 2 in which the gap in transmission is a gap between a downlink pilot time slot in a subframe and a next time slot in the subframe.

5. The method of claim 1 in which the set of received powers comprises received powers taken at different portions of the frame, where the different portions are selected based on a length of a frame time slot.

6. The method of claim 1 further comprising determining a frame timing from the gap in transmission.

7. The method of claim 1 further comprising determining pilot correlations to obtain a frame timing and a serving cell identity.

8. The method of claim 1 in which the determining a set of received powers comprises calculating a set of power profiles.

9. A computer program product for detecting frame timing in a wireless communication network, the computer program product comprising:
   a non-transitory computer-readable medium having non-transitory program code recorded thereon, the program code comprising:
      program code to determine a set of received powers at different sequential portions of a frame; and
      program code to detect a gap in transmission based on a ratio of a minimum received power of a first and third of the sequential portions relative to a maximum received power of a second and fourth of the sequential portions, the first sequential portion, second sequential portion, third sequential portion, and fourth sequential portion being sequential in time.

10. An apparatus for detecting frame timing in a wireless communication network, the apparatus comprising:
   a memory; and
   at least one processor coupled to the memory, the at least one processor being configured:
      to determine a set of received powers at different sequential portions of a frame; and
      to detect a gap in transmission based on a ratio of a minimum received power of a first and third of the sequential portions relative to a maximum received power of a second and fourth of the sequential portions, the first sequential portion, second sequential portion, third sequential portion, and fourth sequential portion being sequential in time.

11. The apparatus of claim 10 in which the wireless communication network comprises a Time Division-Synchronous Code Division Multiple Access network.

12. The apparatus of claim 11 in which the gap in transmission comprises a gap between a first time slot of a subframe and a synchronization downlink (SYNC-DL) field of a downlink pilot time slot in the subframe.

13. The apparatus of claim 11 in which the gap in transmission is a gap between a downlink pilot time slot in a subframe and a next time slot in the subframe.

14. The apparatus of claim 10 in which the set of received powers comprises received powers taken at different portions of the frame, where the different portions are selected based on a length of a frame time slot.

15. The apparatus of claim 10 in which the at least one processor is further configured to determine a frame timing from the gap in transmission.

16. The apparatus of claim 10 in which the at least one processor is further configured to determine pilot correlations to obtain a frame timing and a serving cell identity.

17. The apparatus of claim 10 in which the at least one processor is further configured to determine a set of received powers by calculating a set of power profiles.

* * * * *